United States Patent
Wakiyasu

(10) Patent No.: US 10,852,454 B2
(45) Date of Patent: *Dec. 1, 2020

(54) EYEGLASS LENS

(71) Applicant: ESSILOR INTERNATIONAL, Paris (FR)

(72) Inventor: Hideyuki Wakiyasu, Tokyo (JP)

(73) Assignee: Essilor International, Charenton-le-Pont (FR)

( * ) Notice: Subject to any disclaimer, the term of this patent is extended or adjusted under 35 U.S.C. 154(b) by 116 days.

This patent is subject to a terminal disclaimer.

(21) Appl. No.: 16/306,854

(22) PCT Filed: May 30, 2017

(86) PCT No.: PCT/JP2017/020027
§ 371 (c)(1),
(2) Date: Dec. 3, 2018

(87) PCT Pub. No.: WO2017/209104
PCT Pub. Date: Dec. 7, 2017

(65) Prior Publication Data
US 2019/0154878 A1  May 23, 2019

(30) Foreign Application Priority Data
Jun. 2, 2016 (JP) ................. 2016-110907

(51) Int. Cl.
*G02B 1/04* (2006.01)
*G02C 7/02* (2006.01)
(Continued)

(52) U.S. Cl.
CPC .............. *G02B 1/041* (2013.01); *C08G 18/08* (2013.01); *C08G 18/38* (2013.01);
(Continued)

(58) Field of Classification Search
CPC ........ G02B 1/041; C08G 18/08; C08G 18/38; C08G 18/3863; C08G 18/75; C08G 18/758; C08K 5/3475; G02C 7/02
(Continued)

(56) References Cited

U.S. PATENT DOCUMENTS

2007/0155867 A1  7/2007  Ikari et al.

FOREIGN PATENT DOCUMENTS

| CN | 1910503 | 2/2007 |
|---|---|---|
| CN | 101981153 | 2/2011 |

(Continued)

OTHER PUBLICATIONS

International Search Report and Written Opinion issued in International Patent Application No. PCT/2017/020027, dated Aug. 15, 2017.

(Continued)

*Primary Examiner* — James R Greece
(74) *Attorney, Agent, or Firm* — Norton Rose Fulbright US LLP

(57) ABSTRACT

The present invention addresses the problem of providing an eyeglass lens that has excellent UV absorption properties and low yellowness. This eyeglass lens is produced using a resin composition that contains m-xylylene diisocyanate, a polythiol compound, and a UV absorber. The UV absorber contains at least a compound represented by formula (1) and a compound represented by formula (2). The M value represented by formula (X) is greater than 1.40 but less than 3.20.

6 Claims, 1 Drawing Sheet

(51) Int. Cl.
*C08G 18/38* (2006.01)
*C08G 18/08* (2006.01)
*C08G 18/76* (2006.01)
C08G 18/24 (2006.01)
C08K 5/3475 (2006.01)

(52) U.S. Cl.
CPC ......... *C08G 18/3876* (2013.01); *C08G 18/76* (2013.01); *G02C 7/02* (2013.01); C08G 18/242 (2013.01); C08K 5/3475 (2013.01)

(58) Field of Classification Search
USPC .................................................. 351/159.65
See application file for complete search history.

(56) References Cited

FOREIGN PATENT DOCUMENTS

| | | |
|---|---|---|
| CN | 102633980 | 8/2012 |
| CN | 103980643 | 8/2014 |
| EP | 0786675 | 7/1997 |
| EP | 1808726 | 7/2007 |
| JP | H11218602 | 8/1998 |
| JP | H11-271501 | 10/1999 |
| JP | 3354066 | 12/2002 |
| JP | 2004-315556 | 11/2004 |
| JP | 2006-235587 | 9/2006 |
| JP | 2012-118326 | 6/2012 |
| JP | 2012-173704 | 9/2012 |
| JP | 2012173704 A * | 9/2012 |
| JP | 2013-238634 | 11/2013 |
| JP | 2015-34990 | 2/2015 |
| KR | 10-1612940 | 4/2016 |
| TW | 201237501 | 9/2012 |
| WO | WO 2016021664 | 2/2016 |

OTHER PUBLICATIONS

International Search Report and Written Opinion Issued in Corresponding PCT Patent Application No. PCT/JP2017/020097, dated Aug. 15, 2017.
International Search Report and Written Opinion Issued in Corresponding PCT Patent Application No. PCT/JP2017/020027, dated Aug. 15, 2017.
Office Action Issued in Corresponding Chinese Patent Application No. 201780033884.2, dated Sep. 25, 2019.
Extended European Search Report issued in corresponding European Application No. 17806658.5, dated Feb. 25, 2020.

* cited by examiner

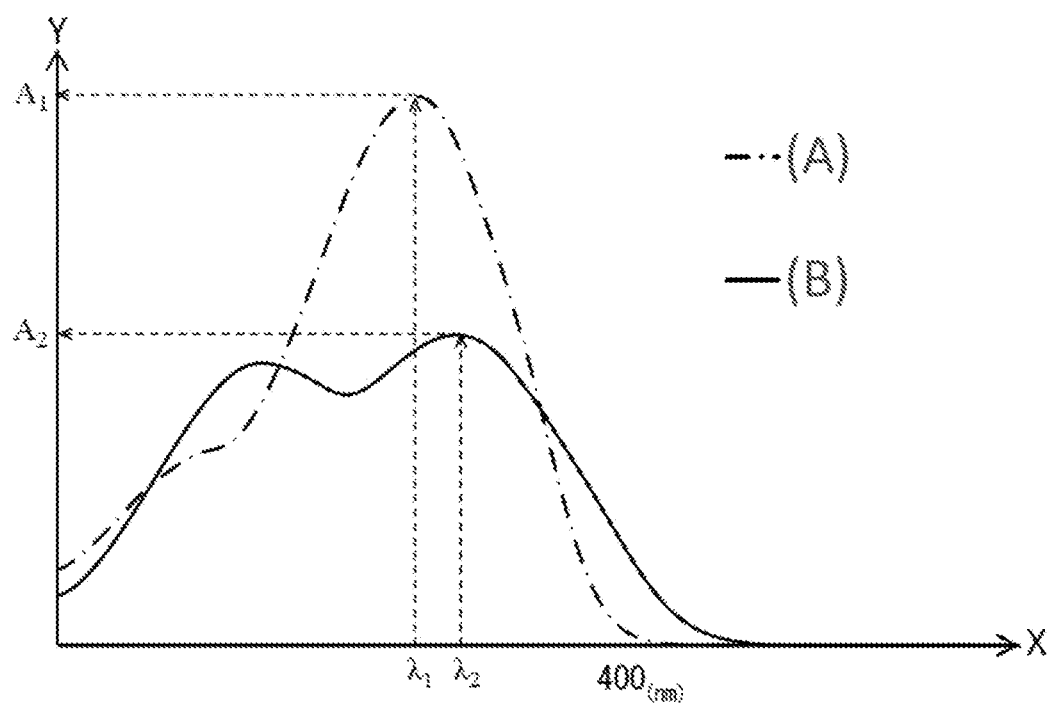

EYEGLASS LENS

CROSS-REFERENCE TO RELATED APPLICATIONS

This application is a national phase application under 35 U.S.C. § 371 of International Application No. PCT/JP2017/020027 filed 30 May 2017, which claims priority to Japanese Application No. 2016-110907 filed 2 Jun. 2016. The entire contents of each of the above referenced disclosures is specifically incorporated by reference herein without disclaimer.

TECHNICAL FIELD

The present invention relates to an eyeglass lens.

PRIOR ART

Patent literature 1 discloses "an ultraviolet-absorbing plastic lens containing an ultraviolet absorber having a molecular weight of 360 or less at a ratio of 0.7-5 parts by weight with respect to 100 parts by weight of raw material monomer".

PRIOR ART LITERATURE

Patent Literature

Patent literature 1: Japanese Laid-Open Patent Application Publication JP H11-271501

SUMMARY OF THE INVENTION

The present invention, according to the embodiments, provides an eyeglass lens prepared using a resin composition containing m-xylylene diisocyanate, a polythiol compound and an ultraviolet absorber, wherein the ultraviolet absorber contains at least a compound represented by formula (1) and a compound represented by formula (2) and the M value represented by formula (X) is greater than 1.40 but less than 3.20.

[Structure 1]

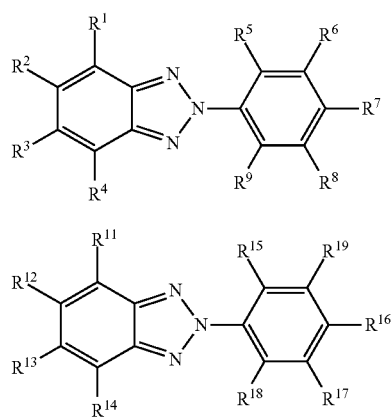

Formula (1)

Formula (2)

(In formula (1), $R^1$-$R^9$ each independently represent a hydrogen atom, an alkyl group, an alkoxy group, or a hydroxyl group. In formula (2), $R^{11}$-$R^{18}$ each independently represent a hydrogen atom, an alkyl group, an alkoxy group, or a hydroxyl group or a halogen atom, $R^{19}$ represents a hydrogen atom, an alkyl group, an alkoxy group, or a phenylalkyl group or a group represented by the following formula (3). However, if $R^{19}$ is a hydrogen atom, an alkyl group, or an alkoxy group, at least one of $R^{11}$-$R^{14}$ is a halogen atom.

$$*\text{-L-}R^{20}$$  Formula (3)

In formula (3), L represents an alkylene group. $R^{20}$ represents an optionally substituted aromatic hydrocarbon group or a heterocyclic ring group.)

$$M\text{ value}=|\lambda_2-\lambda_1|\times(A_2/A_1)\times(W_2/W_1)$$  Formula (X)

(In formula (X), $\lambda_1$ represents the maximum absorption wavelength of a compound represented by formula (1) in the ultraviolet-visible absorption spectrum of a chloroform solution in which the concentration of a compound represented by formula (1) is 10 weight ppm. $\lambda_2$ represents the maximum absorption wavelength of a compound represented by formula (2) in the ultraviolet-visible absorption spectrum of a chloroform solution in which the concentration of a compound represented by formula (2) is 10 weight ppm. $A_1$ represents the absorbance at the maximum absorption wavelength of a compound represented by formula (1) in the ultraviolet-visible absorption spectrum of a chloroform solution in which the concentration of a compound represented by formula (1) is 10 weight ppm. $A_2$ represents the absorbance at the maximum absorption wavelength of a compound represented by formula (2) in the ultraviolet-visible absorption spectrum of a chloroform solution in which the concentration of a compound represented by formula (2) is 10 weight ppm. $W_1$ represents the amount (in parts by weight) of a compound represented by formula (1) when the total of the m-xylylene diisocyanate and the polythiol compound is 100 parts by weight. $W_2$ represents the amount (in parts by weight) of a compound represented by formula (2) when the total of the m-xylylene diisocyanate and the polythiol compound is 100 parts by weight.

BRIEF DESCRIPTION OF DRAWINGS

FIG. 1 is a schematic view showing a typical ultraviolet-visible absorption spectrum of a compound represented by formula (1) and a compound represented by formula (2).

BEST MODE TO CARRY OUT THE INVENTION

The invention will be described in more detail in the following embodiments.

In the following description, there are cases in which constitutional requirements will be described on the basis of typical embodiments of the present invention, but the present invention is not limited to the above-described embodiments.

In addition, in the present specification, a numerical range expressed by "-" means a range including the numerical values described before and after "-" as lower limit and upper limit values.

When the inventors of the present invention used the ultraviolet absorbing plastic lens specifically described in patent literature 1 to investigate the absorption rate (hereinafter also referred to as the "ultraviolet absorption rate") of ultraviolet light (having a wavelength of 200-400 nm) and the low degree of the yellowness index (hereinafter also referred to as "low yellowness"), it became clear that there was the problem in which the level required for current eyeglass lenses had not yet been reached. In addition, the yellowness index means the degree to which the eyeglass lens is colored yellow and is a value which can be measured by a method described later.

Generally, an eyeglass lens containing an ultraviolet absorber has the problem that the yellowness index tends to be high. However, in order to impart excellent ultraviolet absorbency to the eyeglass lens, the required amount of ultraviolet absorber must be combined into the eyeglass lens. Therefore, in terms of the eyeglass lens properties, ultraviolet absorbency and low yellowness have been considered to have a trade-off relationship.

The inventors of the present invention have found that if use is made of an eyeglass lens in which the above-described ultraviolet absorber, which contains a predetermined monomer and an ultraviolet absorber, contains two kinds of predetermined compound, and in which the M value calculated from the content and physical properties of the two kinds of compounds is within a predetermined range, it is possible to provide an eyeglass lens having excellent ultraviolet absorbency and low yellowness and have achieved the present invention.

[Eyeglass Lens]

The eyeglass lens in the present embodiment is an eyeglass lens prepared using a resin composition containing m-xylylene diisocyanate, a polythiol compound and an ultraviolet absorber, wherein the ultraviolet absorber contains at least a compound represented by formula (1) and a compound represented by formula (2) wherein the M value represented by formula (X) is greater than 1.40 but less than 3.20.

An eyeglass lens having such a composition has excellent ultraviolet absorbency and low yellowness. The reason will be described with reference to FIG. 1 below.

FIG. 1 shows a typical ultraviolet-visible absorption spectrum of a compound represented by formula (1) and a typical ultraviolet-visible absorption spectrum of a compound represented by formula (2). The two ultraviolet-visible absorption spectra were measured using a solution prepared by dissolving a compound represented by formula (1) and a compound represented by formula (2) in chloroform each at a concentration of 10 weight ppm. In FIG. 1, the X-axis represents wavelength (nm) and the Y-axis represents the absorbance. FIG. 1 is purely an example and the typical ultraviolet-visible absorption spectrum of an ultraviolet absorber represented by formula (1) and the typical ultraviolet-visible absorption spectrum of an ultraviolet absorber represented by formula (2) are not limited to the embodiment in FIG. 1.

Further, in FIG. 1, curve A shown by the dot-dash line represents the ultraviolet-visible absorption spectrum of a compound represented by formula (1). A compound represented by formula (1) has a benzotriazole structure and usually has a maximum absorption wavelength $\lambda_1$ in the range of 300-380 nm. A compound represented by formula (1) with such ultraviolet absorption properties exhibits excellent ultraviolet absorbency in the range less than 380 nm but has almost no absorption in the visible light range (approximately 400-800 nm). Therefore, the absorbance at around 400 nm of a compound represented by formula (1) is relatively low.

In FIG. 1, curve B shown by the solid line represents the ultraviolet-visible absorption spectrum of a compound represented by formula (2). A compound represented by formula (2) has a benzotriazole structure and has predetermined functional groups, the π-conjugation system is easily extended compared to a compound represented by formula (1) and readily absorbs light in a longer wavelength region. Therefore, a compound represented by formula (2) has higher absorbance in the range of 380-400 nm than a compound represented by formula (1). Thus, the absorbance of a compound represented by formula (2) at around 400 nm is higher than the absorbance of a compound represented by formula (1) at around 400 nm.

On the other hand, since a compound represented by formula (2) readily absorbs visible light at 400 nm and above, the eyeglass lens incorporating this compound readily yellows.

The inventors of the present invention have found that upon using a predetermined monomer and simultaneously using two kinds of compounds having different ultraviolet absorption properties set forth above as the ultraviolet absorbing agent and with the M value calculated from the content and physical properties of the two kinds of compounds being within a predetermined range, an eyeglass having excellent ultraviolet absorbency and low yellowness can be provided.

Hereinafter, the technical significance of the M value will be described in more detail.

In addition, if only a compound represented by formula (1) is used as an ultraviolet absorber, the resulting eyeglass lens shows an insufficient ultraviolet absorption rate (in particular, the ultraviolet absorption rate in the range of 380-400 nm). Further, from the viewpoint of compatibility with resin components in the eyeglass lens, it is impossible to incorporate a large amount of a compound represented by formula (1) in the eyeglass lens. Furthermore, when a compound represented by formula (2) alone is used as an ultraviolet absorber, the resulting eyeglass lens tends to readily yellow. As described above, when only one kind of ultraviolet absorber was used, it was impossible to achieve both an excellent ultraviolet absorption rate and low yellowing in a well-balanced manner.

[M Value]

The M value is a value represented by the following formula (X).

$$M\text{ value} = |\lambda_2 - \lambda_1| \times (A_2/A_1) \times (W_2/W_1) \qquad \text{Formula (X)}$$

(In formula (X), $\lambda_1$ represents the maximum absorption wavelength of a compound represented by formula (1) in the ultraviolet-visible absorption spectrum of a chloroform solution in which the concentration of a compound represented by formula (1) is 10 weight ppm (see FIG. 1). That is, the maximum absorption wavelength $\lambda_1$ refers to a wavelength exhibiting the maximum value in the ultraviolet-visible absorption spectrum obtained by ultraviolet-visible spectrophotometry (UV-Vis) using a solution in which a compound represented by formula (1) was dissolved in chloroform at a concentration of 10 ppm by weight. In addition, if there are multiple maximum values, the maximum value on the longest wavelength side among the multiple maximum values is taken.

Further, $\lambda_2$ represents the maximum absorption wavelength of a compound represented by formula (2) in the ultraviolet-visible absorption spectrum of a chloroform solution in which the concentration of a compound represented by formula (2) is 10 weight ppm (see FIG. 1). That is, the maximum absorption wavelength $\lambda_2$ refers to a wavelength exhibiting the maximum value in the ultraviolet-visible absorption spectrum obtained by ultraviolet-visible spectrophotometry (UV-Vis) using a solution in which a compound represented by formula (2) was dissolved in chloroform at a concentration of 10 weight ppm. In addition, if there are multiple maximum values, the maximum value on the longest wavelength side among the multiple maximum values is taken.

In addition, in FIG. 1, two maxima are shown on curve B which is the ultraviolet-visible absorption spectrum of a compound represented by formula (2) and, among them, the wavelength showing the maximum value on the long wavelength side is set as the maximum absorption wavelength $\lambda_2$.

As apparatus for measuring the ultraviolet-visible absorption spectrum, measurements are carried out using a spectrophotometer under the following conditions.

Cell: quartz, width 1 cm (corresponds to a 1 cm optical path length)

Blank: solvent (chloroform)

In formula (X), $|\lambda_2-\lambda_1|$ is the absolute value of the difference between $\lambda_1$ and $\lambda 2$ and indicates the difference in the maximum absorption wavelength of a compound represented by formula (1) and the maximum absorption wavelength of a compound represented by formula (2). If this value is too low, the absorption band becomes narrow and the ultraviolet absorbency of the eyeglass lens tends to be poor. However, if this value is too high, the absorption band tends to be in the visible light region and the low yellowness of the eyeglass lens tends to be poor.

In addition, although the size of $\lambda_1$ is not particularly limited, it can be 340-350 nm or 343-347 nm from the viewpoint that the eyeglass lens of the present embodiment has superior ultraviolet absorbency and low yellowness.

Although the size of $\lambda_2$ is not particularly limited, it can be 340-370 nm or 341-354 nm from the viewpoint that the eyeglass lens of the present embodiment has superior ultraviolet absorbency and low yellowness.

Further, although the value of $|\lambda_2-\lambda_1|$ is not particularly limited, it can be 0.1-30 nm or 1-9 nm from the viewpoint that the eyeglass lens of the present embodiment has superior ultraviolet absorbency and low yellowness.

In addition, in FIG. 1, although $\lambda_2$ is larger than $\lambda_1$, it is not limited to this embodiment and $\lambda_1$ may be larger than $\lambda_2$.

In formula (X), $A_1$ represents the absorbance at the maximum absorption wavelength of a compound represented by formula (1) in the ultraviolet-visible absorption spectrum of a chloroform solution in which the concentration of a compound represented by formula (1) is 10 weight ppm (see FIG. 1). That is, absorbance $A_1$ is the absorbance at the maximum absorption wavelength $\lambda_1$ in an ultraviolet-visible absorption spectrum obtained by ultraviolet-visible spectrophotometry (UV-Vis) using a solution in which a compound represented by formula (1) was dissolved in chloroform at a concentration of 10 ppm by weight.

$A_2$ represents the absorbance at the maximum absorption wavelength of a compound represented by formula (2) in the ultraviolet-visible absorption spectrum of a chloroform solution in which the concentration of a compound represented by formula (2) is 10 weight ppm (see FIG. 1). That is, absorbance $A_2$ is the absorbance at the maximum absorption wavelength $\lambda_2$ in an ultraviolet-visible absorption spectrum obtained by ultraviolet-visible spectrophotometry (UV-Vis) using a solution in which a compound represented by formula (2) was dissolved in chloroform at a concentration of 10 ppm by weight.

The method of measuring the absorbance is the same as the method of measuring the maximum absorption wavelength described above.

In formula (X), $A_2/A_1$ means the ratio of the amount of ultraviolet absorption at the maximum absorption wavelength of a compound represented by formula (2) to the amount of ultraviolet absorption at the maximum absorption wavelength of a compound represented by formula (1). If this value is too low, absorbency on the long wavelength side due to the absorption spectrum of a compound represented by formula (2) becomes insufficient, and the ultraviolet absorbency of the eyeglass lens tends to be poor. However, if this value is too high, absorbency on the long wavelength side becomes excessive, and the low yellowness of the eyeglass lens tends to be poor.

Although the size of $A_1$ is not particularly limited, it can be 0.2-2.0, further 0.3-2.0, further still 0.4-1.1 and also 0.7-1.1 from the viewpoint that the eyeglass lens of the present embodiment has superior ultraviolet absorbency and low yellowness.

Although the size of $A_2$ is not particularly limited, it can be 0.2-0.9 or 0.3-0.6 from the viewpoint that the eyeglass lens of the present embodiment has superior ultraviolet absorbency and low yellowness.

Further, although the value of $A_2/A_1$ is not particularly limited, it can be 0.1-4.5, further 0.2-3.4 and further still 0.3-0.6 from the viewpoint that the eyeglass lens of the present embodiment has superior ultraviolet absorbency and low yellowness.

In formula (X), $W_1$ represents the amount (in parts by weight) of a compound represented by formula (1) when the total of the m-xylylene diisocyanate and the polythiol compound is 100 parts by weight. That is, the above $W_1$ corresponds to the amount (in parts by weight) of a compound represented by formula (1) with respect to 100 wt % of monomer mixture composed of m-xylylene diisocyanate and a polythiol compound in the resin composition.

$W_2$ represents the amount (in parts by weight) of a compound represented by formula (2) when the total of the m-xylylene diisocyanate and the polythiol compound is 100 parts by weight. That is, the above $W_2$ corresponds to the amount (in parts by weight) of a compound represented by formula (2) with respect to 100 wt % of monomer mixture composed of m-xylylene diisocyanate and a polythiol compound in the resin composition. $W_2/W_1$ means the ratio of the amount of a compound represented by formula (2) to the amount of a compound represented by formula (1). If this value is too low, absorbency on the long wavelength side due to the absorption spectrum of a compound represented by formula (2) becomes insufficient, and the ultraviolet absorbency of the eyeglass lens tends to be poor. However, if this value is too high, absorbency on the long wavelength side becomes excessive, and the low yellowness of the eyeglass lens tends to be poor.

The specific ranges relating to $W_1$ and $W_2$ will be described later in detail.

As described above, if the values of the items constituting the M value are too low, the ultraviolet absorbency of the eyeglass lens tends to be poor and, if it is too high, the low yellowness of the eyeglass lens tends to be poor.

Thus, the M value of the eyeglass lens of the present embodiment is greater than 1.40 and less than 3.20. When the M value is below the lower limit value, the ultraviolet absorbency of the eyeglass lens is poor and, when it is above the upper limit value, the low yellowness of the eyeglass lens is poor. In particular, the M value can be greater than 1.63 and less than 3.20 and can be greater than 1.63 and less than 2.75 from the viewpoint that the eyeglass lens of the present embodiment has superior ultraviolet absorbency and low yellowness.

Since, the eyeglass lens of the present embodiment is formed using a predetermined monomer as mentioned above and simultaneously using two kinds of compound having different ultraviolet absorption properties as ultraviolet absorbers and with the M value calculated from the content and physical properties of the ultraviolet absorber being within a predetermined range, it is assumed that both ultraviolet absorbency and low yellowness, which were considered to have a trade-off relationship, could coexist at a high level.

(Resin Composition)

The resin composition contains m-xylylene diisocyanate, a polythiol compound, and an ultraviolet absorber. Hereinafter, and each component present in the resin composition will be described in detail.

(Ultraviolet Absorber)

The ultraviolet absorber contains at least a compound represented by the following formula (1) and a compound represented by the following formula (2). These 2 compounds (ultraviolet absorbers) are structurally similar and both show excellent compatibility. In addition, these 2 kinds of ultraviolet absorbers also exhibit excellent compatibility with the monomer described later and are easily dispersed uniformly in the eyeglass lens.

Among the ultraviolet absorbers used in this embodiment, an ultraviolet absorber having a molecular weight of 360 or less can be used at less than 0.7 parts by weight when the total of m-xylylene diisocyanate and a polythiol compound is taken as 100 parts by weight.

(Compound Represented by Formula (1))

The ultraviolet absorber used in the present embodiment contains a compound (an ultraviolet absorber) represented by the following formula (1).

[Structure 2]

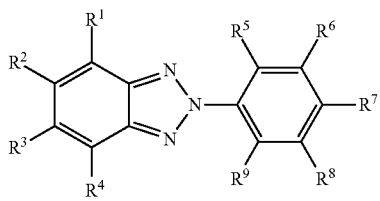

Formula (1)

In formula (1), $R^1$-$R^9$ each independently represent a hydrogen atom, an alkyl group (the number of carbon atoms can be 1-8), an alkoxy group (the number of carbon atoms can be 1-8), or a hydroxyl group. Among them, $R^1$-$R^4$ can be hydrogen atoms. Further, at least one of $R^5$-$R^9$ can be a hydroxyl group and $R^5$ can be a hydroxyl group. Further, $R^7$ can be an alkoxy group from the viewpoint that the eyeglass lens of the present embodiment has superior ultraviolet absorbency and low yellowness. The number of carbon atoms in the alkoxy group can be 1-5.

Although the molecular weight of a compound represented by the above formula (1) is not particularly limited, it can be 360 or less and can be 340 or less from the viewpoint of obtaining an eyeglass lens having superior low yellowness. In particular, the molecular weight of a compound represented by the above formula (1) can be 290 or less and can be 280 or less from the viewpoint of obtaining an eyeglass lens having superior ultraviolet absorbency. The lower limit value for the molecular weight of a compound represented by the above formula (1) is not particularly limited but is generally 210 or more.

In addition, in the present specification, the molecular weight means the molecular weight which can be calculated from the structural formula.

As an ultraviolet absorber represented by above-mentioned formula (1), 2-(2-hydroxy-5-methylpropyl)-2H-benzotriazole, 2-(2-hydroxy-5-t-octylphenyl)-2H-benzotriazole, 2-(4-ethoxy-2-hydroxyphenyl)-2H-benzotriazole, and 2-(4-butoxy-2-hydroxyphenyl)-2H-benzotriazole and the like can be mentioned.

(Compound Represented by Formula (2))

The ultraviolet absorber used in the present embodiment contains a compound (an ultraviolet absorber) represented by formula (2).

[Structure 3]

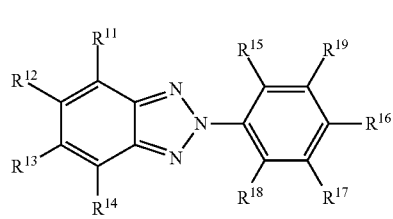

Formula (2)

In formula (2), $R^{11}$-$R^{19}$ each independently represent a hydrogen atom, an alkyl group (the number of carbon atoms can be 1-8), an alkoxy group (the number of carbon atoms can be 1-8), or a hydroxyl group or a halogen atom (for example, fluorine, chlorine, bromine and the like). $R^{11}$-$R^{14}$ each independently represent a hydrogen atom, an alkyl, an alkoxy, or a hydroxyl group or a halogen atom, each can be a hydrogen atom, an alkyl, an alkoxy, or a hydroxyl group, each can be a hydrogen atom or an alkyl group or further each can be hydrogen atoms. In addition, if $R^{19}$ is a hydrogen atom, an alkyl group, or an alkoxy group, at least one of $R^{11}$-$R^{14}$ is a halogen atom.

$R^{15}$ can be a hydroxyl group.

$R^{19}$ represents a hydrogen atom, an alkyl group (the number of carbon atoms can be 1-8), an alkoxy group (the number of carbon atoms can be 1-8), a phenylalkyl group (the number of carbon atoms is 1-8), or a group represented by the following formula (3), a phenylalkyl group, or a group represented by the following formula (3). In addition, in the present specification, a phenylalkyl group means a group in which at least one hydrogen atom in the phenyl group is substituted with an alkyl group.

*-L-$R^{20}$    Formula (3)

In formula (3), L represents an alkylene group. $R^{20}$ represents an optionally substituted aromatic hydrocarbon group or heterocyclic ring group. Examples of optionally substituted aromatic hydrocarbon groups include a phenyl group, a tolyl group, a xylyl group, a naphthyl group, and an anthryl group, and can be a phenyl group or a substituted phenyl group from the viewpoint that the ultraviolet absorbency on the longer wavelength side improves. The substituent is not particularly limited, for example, an alkyl group, an alkoxy group, a hydroxyl group, and a halogen atom can be mentioned and, among these, a hydroxyl group or an alkyl group can be used.

As an optionally substituted heterocyclic group, aliphatic heterocyclic groups such as an oxetanyl group, a pyrrolidinyl group, a tetrahydrofuryl group, and a tetrahydrophthalamide group and the like and an aromatic heterocyclic group such as a thienyl group, a furanyl group, a pyridyl group, a pyrimidyl group, a thiazolyl group, an oxazolyl group, a triazolyl group, a benzothiophenyl group, a benzofuranyl group, a benzothiazolyl group, a benzoxazolyl group, and a benzotriazolyl group and the like can be mentioned.

$R^{17}$ can be an alkyl group and, in particular, it can be an alkyl group having 1-8 carbon atoms. As the kind of substituent, groups exemplified as substituents which may be substituted on the above aromatic hydrocarbon group can be mentioned.

The molecular weight of a compound represented by the above formula (2) is not particularly limited and can be greater than 360, it can be greater than 380 and can even be greater than 400 from the viewpoint of obtaining an eyeglass lens having superior ultraviolet absorbency. The upper limit for the molecular weight of the 2nd compound is not particularly limited but is generally 1000 or less.

A compound represented by the above formula (2) can be a compound represented by the following formula (4) from the viewpoint that the eyeglass lens of the present embodiment has superior ultraviolet absorbency and low yellowness.

[Structure 4]

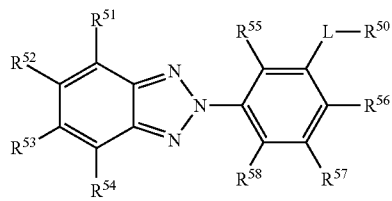

(4)

In formula (4), $R^{51}$-$R^{58}$ each independently represent a hydrogen atom, an alkyl group (the number of carbons can be 1-8), an alkoxy group (the number of carbons can be 1-8), or a hydroxyl group, L represents an alkylene group (the number of carbon atoms can be 1-3), and $R^{50}$ represents an optionally substituted aromatic hydrocarbon group or a heterocyclic ring group. In addition, the embodiments of $R^{51}$-$R^{54}$, $R^{55}$-$R^{58}$, and $R^{50}$ are the same as those of the above-described $R^{11}$-$R^{14}$, $R^{15}$-$R^{18}$, and $R^{20}$, respectively.

As an ultraviolet absorber represented by the above-mentioned formula (2), 2-(3-tert-butyl-2-hydroxy-5-methylphenyl)-5-chloro-2H-benzotriazole, 2-(2H-benzotriazol-2-yl)-4-methyl-6-(3,4,5,6-tetrahydrophthalimidylmethyl) phenol, 6-(2-benzotriazolyl)-4-t-octyl-6'-t-butyl-4'-methyl-2,2'-methylenebisphenol, and 2-(2H-benzotriazol-2-yl)-6-(1-methyl-1-phenylethyl)-4-(1,1,3,3-tetramethylbutyl) phenol and the like can be mentioned.

(Other Compounds)

The ultraviolet absorber used in the present embodiment may contain at least a compound represented by formula (1) and a compound represented by formula (2) and, as long as the eyeglass lens of the present embodiment has superior ultraviolet absorbency and low yellowness, other compounds may be present as an ultraviolet absorber.

(Ultraviolet Absorber with a Molecular Weight of 360 or Less)

Among the ultraviolet absorbers used in this embodiment, the amount of ultraviolet absorber having a molecular weight of 360 or less can be used at less than 0.7 parts by weight when the total of m-xylylene diisocyanate and a polythiol compound is taken as 100 parts by weight. If the amount of ultraviolet absorber having a molecular weight of 360 or less is lower than the upper limit value, an eyeglass lens having superior low yellowness can be obtained. The lower limit of the amount of ultraviolet absorber having a molecular weight of 360 or less is not particularly limited and can be 0.001 parts by weight or more, further 0.01 parts by weight or more and further still 0.1 parts by weight or more from the viewpoint of obtaining an eyeglass lens having superior ultraviolet absorbency.

In addition, the above-mentioned "amount of ultraviolet absorber having a molecular weight of 360 or less" means the sum of the amounts when the resin composition used in the present embodiment contains multiple compounds having a molecular weight of 360 or less as an ultraviolet absorber.

The amount of ultraviolet absorber in the resin composition used in the present embodiment can be 0.01-7.0 parts by weight, further 0.1-6.0 parts by weight and further still 0.1-5.0 parts by weight when the total of m-xylylene diisocyanate and a polythiol compound is taken as 100 parts by weight from the viewpoint that the eyeglass lens of the present embodiment has superior ultraviolet absorbency and low yellowness.

In particular, the amount $W_1$ (in parts by weight) of a compound represented by the above formula (1) and the amount $W_2$ (in parts by weight) of a compound represented by the above formula (2) are not particularly limited. In particular, $W_1$ can be 0.001-0.7 parts by weight and 0.01-0.7 parts by weight when the total of m-xylylene diisocyanate and a polythiol compound is taken as 100 parts by weight from the viewpoint that the eyeglass lens of the present embodiment has superior ultraviolet absorbency and low yellowness. $W_2$ can be 0.001-4.0 parts by weight, further 0.01-4.0 parts by weight, and further still 0.1-4.0 parts by weight.

The sum ($W_1+W_2$) of the amount $W_1$ of a compound represented by formula (1) and the amount $W_2$ of a compound represented by formula (2) is not particularly limited and can be 0.01 parts by weight and, from the viewpoint of obtaining an eyeglass lens having superior ultraviolet absorbency, can be 0.1 parts by weight, further 1.0 parts by weight and further still 1.5 parts by weight. In addition, the upper limit value is not particularly limited and can be 7.0 parts by weight or less and 5.0 parts by weight or less from the viewpoint that an eyeglass lens having superior low yellowness can be obtained.

Although the value of $W_1/W_2$ is not particularly limited, it can be 0.01-100, further 0.05-10 and further still 0.5-3 from the viewpoint that the eyeglass lens of the present embodiment has superior ultraviolet absorbency and low yellowness.

(Polythiol Compound)

The polythiol compound is not particularly limited as long as it has 2 or more mercapto groups in the molecule but it may have 3 or 4 mercapto groups and, for example, pentaerythritol tetrakis thioglycolate, pentaerythritol tetrakis (3-mercaptopropionate), 1,2-bis[(2-mercaptoethyl)thio]-3-mercaptopropane, 4-mercaptomethyl-3,6-dithia-1,8-octanedithiol ethanedithiol and bis(mercaptomethyl)-3,6,9-trithio-1,11-undecanedithiol can be mentioned. One kind of polythiol compound may be used alone or two or more kinds may be used in combination.

Other than the above-mentioned polythiol compounds, the compounds described in paragraphs [0051-0058] in Japanese Laid-Open Patent Application Publication JP2015-34990 and in paragraphs [0027-0032] in Japanese Laid-Open Patent Application Publication JP1999-271501 and the like can be used and the contents of these are incorporated herein.

[Other Polyisocyanates]

The resin composition may contain polyisocyanates other than m-xylylene diisocyanate as long as the eyeglass lens of this embodiment has superior ultraviolet absorbency and low yellowness.

The ratio of the amount of m-xylylene diisocyanate (the total amount when other polyisocyanates are also present) to the amount of polythiol compound in the resin composition can be adjusted so that the ratio of functional isocyanate groups and mercapto groups shows an NCO/SH (molar ratio) value of 0.5-3.0 and can be 0.5-1.5

[Other Components]

The resin composition used in the present embodiment may contain components other than those described above as long as the eyeglass lens of the present embodiment has excellent ultraviolet absorbency and low yellowness. As components other than the above, for example, a preliminary reaction catalyst, a reaction adjustment agent, a polymerization catalyst, a dye and a pigment, and other additives can be mentioned.

(Polymerization Catalyst)

As a polymerization catalyst, tin compounds and amines, phosphines, quaternary ammonium salts, quaternary phosphonium salts, tertiary sulfonium salts, secondary iodonium salts, mineral acids, Lewis acids, organic acids, silicic acids, boron tetrafluorides, peroxides, azo compounds, condensates of aldehyde and ammonia compounds, guanidines, thiourea acids, thiazoles, sulfenamides, thiurams, dithiocarbamates, xanthogenates, and acidic phosphoric esters disclosed in Japanese Laid-Open Patent Application Publication JP2004-315556 can be mentioned and, in particular, tin compounds can be used. These polymerization catalysts may be used alone, or two or more kinds may be used in combination.

The addition amount of polymerization catalyst can be 0.0001-10.0 parts by weight and can be 0.001-5.0 parts by weight with respect to 100 parts by weight for the total amount of m-xylylene diisocyanate and polythiol compound.

(Dyes and Pigments)

Dyes and pigments are not particularly limited as long as they are substances capable of decreasing poor initial color tone or yellowness or redness, for example, dyes and/or pigments for optical materials such as commercially available bluing agents for use in eyeglass lens materials can be used.

(Method of Producing the Eyeglass Lens)

As a method of producing the eyeglass lens of this embodiment, the lens can be manufactured by curing a resin composition obtained by mixing the above-mentioned respective components. In addition, after curing treatment, desired processing (coating and/or cutting etc.) may be performed on the obtained eyeglass lens as needed. When producing the eyeglass lens, the kind and amount of the ultraviolet absorber can be selected and designed so that the M value is within a predetermined range. In addition, in the present specification, the kind of eyeglass lens is not particularly limited and, for example, includes a finished lens wherein both the convex and concave surfaces are optically finished and that is molded to the desired power, a semi-finished lens that is optically finished only on the convex surface like a finished lens, and that is optically finished on the concave side to match the desired power according to subsequent orders and the like. As well as the above, lenses not subjected to grinding processing are also included.

The method of producing the resin composition is not particularly limited and a method of simultaneously mixing the above-mentioned respective components in the same container to produce a resin composition, a method of adding and mixing the respective components in stages to produce a resin composition, and a method in which several components are separately mixed and further mixed again in the same container to produce a resin composition can be mentioned. The mixing order of each component is not limited.

A degassing procedure may be carried out under reduced pressure before, during, or after mixing of each component and additive.

There are no particular restrictions for the method for curing the resin composition, for example, after injecting the resin composition into a glass or metal mold, thermal polymerization using an electric furnace or the like, ultraviolet curing using ultraviolet light irradiation, electron beam curing using electron beam irradiation, and a method in which radiation curing is performed using irradiation can be mentioned. The curing time using thermal polymerization curing can be 0.1-100 hours usually 1-72 hours, and the curing temperature can be −10-160° C. usually 0-140° C. Polymerization can be carried out by maintaining a predetermined polymerization temperature for a predetermined time, raising the temperature at 0.1-100° C./h, and cooling at 0.1-100° C./h or using combinations thereof. Further, after curing has been completed, the eyeglass lens may be annealed to remove distortion in the eyeglass lens.

The eyeglass lens of the present embodiment may have a coating layer on one or both sides. As a coating layer, for example, a primer layer, a hard coating layer, an anti-reflection film layer, an anti-fog coating film layer, a stain-proof film layer and the like can be mentioned. These layers may be laminated.

The thickness of the eyeglass lens of the present embodiment is not particularly limited and is often about 1-30 mm from the viewpoint of handling. The eyeglass lens may not be transparent as long as it is translucent, and it may be colored. Furthermore, the surface shape is selected from an arbitrary shape such as convex, flat, and concave.

EXAMPLES

Embodiments of the present invention will be described hereinafter in more detail based on examples. The materials, amounts to be used, proportions, treatment contents, treatment procedures and the like shown in examples below can be appropriately changed without departing from the gist of the present invention. Therefore, the scope of the present invention is not intended to be construed as limited by the examples shown below.

Preparation of the Eyeglass Lens 50.7 parts by weight m-xylylene diisocyanate, 49.3 parts by weight bis(mercaptomethyl)-3,6,9-trithio-1,11-undecanedithiol (corresponding to a polythiol compound), 0.008 parts by weight dimethyl tin dichloride as a polymerization catalyst, 0.1 parts by weight an inner releaser containing phosphoric acid ester as the main component, 0.6 weight ppm Diaresin Blue J manufactured by Mitsubishi Chemical Corporation as a bluing agent and an ultraviolet absorber mentioned below were mixed to homogeneity to prepare a resin composition. The resin composition was then degassed and injected into a glass mold to cure the resin composition by thermal polymerization. After completion of curing, the mold was released, the obtained lens was cleaned, and the eyeglass lens, after washing, was subjected to annealing treatment to obtain an eyeglass lens for evaluation.

Example 1

In the above "Preparation of the Eyeglass Lens", 2-(4-butoxy-2-hydroxyphenyl)-2H-benzotriazole (molecular weight 283.3, corresponding to a compound represented by formula (1)) and 2-(2H-benzotriazol-2-yl)-6-(1-methyl-1-phenylethyl)-4-(1,1,3,3-tetramethylbutyl) phenol (molecular weight 441.6, corresponding to a compound represented by formula (4)) were used as ultraviolet absorbers and eyeglass lens 1 for evaluation was obtained.

The amount of 2-(4-butoxy-2-hydroxyphenyl)-2H-benzotriazole used was 0.64 parts by weight to a total of 100 parts by weight of the mixture of m-xylylene diisocyanate and bis(mercaptomethyl)-3,6,9-trithio-1,11-undecanedithiol (hereinafter referred to as "monomer mixture").

The amount of 2-(2H-benzotriazol-2-yl)-6-(1-methyl-1-phenylethyl)-4-(1,1,3,3-tetramethylbutyl) phenol used was 1.0 parts by weight relative to 100 parts by weight of the total amount of monomer mixture.

In addition, in the ultraviolet-visible absorption spectrum of a chloroform solution having a concentration of 2-(4-butoxy-2-hydroxyphenyl)-2H-benzotriazole of 10 ppm, the maximum absorption wavelength of this compound was 346 nm and the absorbance at this wavelength was 0.92.

In addition, in the ultraviolet-visible absorption spectrum of a chloroform solution having a concentration of 2-(2H-benzotriazol-2-yl)-6-(1-methyl-1-phenylethyl)-4-(1,1,3,3-tetramethylbutyl) phenol of 10 ppm, the maximum absorption wavelength of this compound was 349 nm and the absorbance at this wavelength was 0.32.

Example 2

In the above "Preparation of the Eyeglass Lens", 2-(4-ethoxy-2-hydroxyphenyl)-2H-benzotriazole (molecular weight 255.3, corresponding to a compound represented by formula (1)) and 2-(2H-benzotriazol-2-yl)-6-(1-methyl-1-phenylethyl)-4-(1,1,3,3-tetramethylbutyl) phenol (molecular weight 441.6, corresponding to a compound represented by formula (4)) were used as ultraviolet absorbers and eyeglass lens 2 for evaluation was obtained.

The amount of 2-(4-ethoxy-2-hydroxyphenyl)-2H-benzotriazole used was 0.64 parts by weight relative to 100 parts by weight of the total amount of monomer mixture.

The amount of 2-(2H-benzotriazol-2-yl)-6-(1-methyl-1-phenylethyl)-4-(1,1,3,3-tetramethylbutyl) phenol used was 0.86 parts by weight relative to 100 parts by weight of the total amount of monomer mixture.

In addition, in the ultraviolet-visible absorption spectrum of a chloroform solution having a concentration of 2-(4-ethoxy-2-hydroxyphenyl)-2H-benzotriazole of 10 ppm, the maximum absorption wavelength of this compound was 344 nm and the absorbance at this wavelength was 1.02.

In addition, the optical characteristics of 2-(2H-benzotriazol-2-yl)-6-(1-methyl-1-phenylethyl)-4-(1,1,3,3-tetramethylbutyl) phenol are as described in Example 1.

Example 3

In the above "Preparation of the Eyeglass Lens", 2-(4-ethoxy-2-hydroxyphenyl)-2H-benzotriazole (molecular weight 255.3, corresponding to a compound represented by formula (1)) and 2-(2H-benzotriazol-2-yl)-6-(1-methyl-1-phenylethyl)-4-(1,1,3,3-tetramethylbutyl) phenol (molecular weight 441.6, corresponding to a compound represented by formula (4)) were used as ultraviolet absorbers and eyeglass lens 3 for evaluation was obtained.

The amount of 2-(4-ethoxy-2-hydroxyphenyl)-2H-benzotriazole used was 0.64 parts by weight relative to 100 parts by weight of the total amount of monomer mixture.

The amount of 2-(2H-benzotriazol-2-yl)-6-(1-methyl-1-phenylethyl)-4-(1,1,3,3-tetramethylbutyl) phenol used was 1.0 parts by weight relative to 100 parts by weight of the total amount of monomer mixture.

In addition, the optical characteristics of 2-(4-ethoxy-2-hydroxyphenyl)-2H-benzotriazole are as described in Example 2.

In addition, the optical characteristics of 2-(2H-benzotriazol-2-yl)-6-(1-methyl-1-phenylethyl)-4-(1,1,3,3-tetramethylbutyl) phenol are as described in Example 1.

Example 4

In the above "Preparation of the Eyeglass Lens", 2-(4-ethoxy-2-hydroxyphenyl)-2H-benzotriazole (molecular weight 255.3, corresponding to a compound represented by formula (1)) and 2-(2H-benzotriazol-2-yl)-6-(1-methyl-1-phenylethyl)-4-(1,1,3,3-tetramethylbutyl) phenol (molecular weight 441.6, corresponding to a compound represented by formula (4)) were used as ultraviolet absorbers and eyeglass lens 4 for evaluation was obtained.

The amount of 2-(4-ethoxy-2-hydroxyphenyl)-2H-benzotriazole used was 0.64 parts by weight relative to 100 parts by weight of the total amount of monomer mixture.

The amount of 2-(2H-benzotriazol-2-yl)-6-(1-methyl-1-phenylethyl)-4-(1,1,3,3-tetramethylbutyl) phenol used was 1.11 parts by weight relative to 100 parts by weight of the total amount of monomer mixture.

In addition, the optical characteristics of 2-(4-ethoxy-2-hydroxyphenyl)-2H-benzotriazole are as described in Example 2.

In addition, the optical characteristics of 2-(2H-benzotriazol-2-yl)-6-(1-methyl-1-phenylethyl)-4-(1,1,3,3-tetramethylbutyl) phenol are as described in Example 1.

Comparative Example 1

In the above "Preparation of the Eyeglass Lens", 2-(2-hydroxy-5-t-octylphenyl)-2H-benzotriazole (molecular weight 323.4, corresponding to a compound represented by formula (1)) and 2-(2H-benzotriazol-2-yl)-4-methyl-6-(3,4,5,6-tetrahydrophthalimidylmethyl) phenol (molecular weight 388.4, corresponding to a compound represented by formula (2)) were used as ultraviolet absorbers and eyeglass lens C1 for evaluation was obtained.

The amount of 2-(2-hydroxy-5-t-octylphenyl)-2H-benzotriazole used was 0.6 parts by weight relative to 100 parts by weight of the total amount of monomer mixture.

The amount of 2-(2H-benzotriazol-2-yl)-4-methyl-6-(3,4,5,6-tetrahydrophthalmidylmethyl) phenol used was 0.6 parts by weight relative to 100 parts by weight of the total amount of monomer mixture.

In addition, in the ultraviolet-visible absorption spectrum of a chloroform solution having a concentration of 2-(2-hydroxy-5-t-octylphenyl)-2H-benzotriazole of 10 ppm, the maximum absorption wavelength of this compound was 342 nm and the absorbance at this wavelength was 0.49.

In addition, in the ultraviolet-visible absorption spectrum of a chloroform solution having a concentration of 2-(2H-benzotriazol-2-yl)-4-methyl-6-(3,4,5,6-tetrahydrophthalmidylmethyl) phenol of 10 ppm, the maximum absorption wavelength of this compound was 343 nm and the absorbance at this wavelength was 0.46.

Comparative Example 2

In the above "Preparation of the Eyeglass Lens", 2-(4-ethoxy-2-hydroxyphenyl)-2H-benzotriazole (molecular weight 255.3, corresponding to a compound represented by formula (1)) and 6-(2-benzotriazolyl)-4-t-octyl-6'-t-butyl-4'-methyl-2,2'-methylene bisphenol (molecular weight 499.7, corresponding to a compound represented by formula (4)) were used as ultraviolet absorbers and eyeglass lens C2 for evaluation was obtained.

The amount of 2-(4-ethoxy-2-hydroxyphenyl)-2H-benzotriazole used was 0.64 parts by weight relative to 100 parts by weight of the total amount of monomer mixture.

The amount of 6-(2-benzotriazolyl)-4-t-octyl-6'-t-butyl-4'-methyl-2,2'-methylene bisphenol used was 1.31 parts by weight relative to 100 parts by weight of the total amount of monomer mixture.

In addition, the optical characteristics of 2-(4-ethoxy-2-hydroxyphenyl)-2H-benzotriazole are as described in Example 2.

In addition, in the ultraviolet-visible absorption spectrum of a chloroform solution having a concentration of 6-(2-benzotriazolyl)-4-t-octyl-6'-t-butyl-4'-methyl-2,2'-methylene bisphenol of 10 ppm, the maximum absorption wavelength of this compound was 342 nm and the absorbance at this wavelength was 0.35.

Comparative Example 3

In the above "Preparation of the Eyeglass Lens", 2-(4-ethoxy-2-hydroxyphenyl)-2H-benzotriazole (molecular weight 255.3, corresponding to a compound represented by formula (1)) and 2-(2H-benzotriazol-2-yl)-6-(1-methyl-1-phenylethyl)-4-(1,1,3,3-tetramethylbutyl) phenol (molecular weight 441.6, corresponding to a compound represented by formula (4)) were used as ultraviolet absorbers and eyeglass lens C3 for evaluation was obtained. However, the obtained lens exhibited cloudiness.

The amount of 2-(4-ethoxy-2-hydroxyphenyl)-2H-benzotriazole used was 0.64 parts by weight relative to 100 parts by weight of the total amount of monomer mixture.

The amount of 2-(2H-benzotriazol-2-yl)-6-(1-methyl-1-phenylethyl)-4-(1,1,3,3-tetramethylbutyl) phenol used was 1.53 parts by weight relative to 100 parts by weight of the total amount of monomer mixture.

In addition, the optical characteristics of 2-(4-ethoxy-2-hydroxyphenyl)-2H-benzotriazole are as described in Example 2.

In addition, the optical characteristics of 2-(2H-benzotriazol-2-yl)-6-(1-methyl-1-phenylethyl)-4-(1,1,3,3-tetramethylbutyl) phenol are as described in Example 1.

Evaluation Method

An evaluation of the ultraviolet absorbency and low yellowness of the eyeglass lenses for evaluation in the examples and comparative examples was carried out using the following method. Initially, the ultraviolet-visible absorption spectrum of the eyeglass lenses for evaluation was measured every 1 nm over a wavelength range of 280-780 nm using a U-4100 spectrophotometer manufactured by Hitachi High-Technologies Corporation. Light transmittance and yellowness index were calculated from these measurements. The evaluation results are shown in Table 1.

Here, the light transmittance is the transmittance (%) at each wavelength and the evaluation was performed using the maximum light transmittance (%) at a wavelength of 400 nm or less. A sample having a maximum light transmittance of 1.0% or less at a wavelength of 400 nm or less was determined to exhibit good ultraviolet absorbency. In addition, light transmittance was measured for each eyeglass lens for evaluation with an S-1.25 (D) lens of 1.0 mm thickness. The light transmittance of each eyeglass lens for evaluation at 400 nm or less is shown in Table 2.

Here, the yellowness index (YI) was calculated based on JIS-K 7373, which calculates the tristimulus values X, Y, Z from the ultraviolet-visible absorption spectrum, and a yellowness index below 5.0 was taken to be good. In addition, the yellowness index was measured for each eyeglass lens for evaluation of an S-0.00 (D) lens having a thickness of 2.0 mm.

TABLE 1

| | Compound represented by formula (1) | | | | Compound represented by formula (2) or (4) | | | | | M value | Maximum light transmittance (%) at 400 nm or less | Yellowness index (YI) |
|---|---|---|---|---|---|---|---|---|---|---|---|---|
| | $\lambda_1$ (nm) | $A_1$ | $W_1$ | Mwt. | $\lambda_2$ (nm) | $A_2$ | $W_2$ | Mwt. | $W_1 + W_2$ | | | |
| Example 1 | 346 | 0.92 | 0.64 | 283.3 | 349 | 0.32 | 1.0 | 441.6 | 1.64 | 1.63 | 0.36 | 4.7 |
| Example 2 | 344 | 1.02 | 0.64 | 255.3 | 349 | 0.32 | 0.86 | 441.6 | 1.50 | 2.11 | 0.56 | 4.3 |
| Example 3 | 344 | 1.02 | 0.64 | 255.3 | 349 | 0.32 | 1.0 | 441.6 | 1.64 | 2.45 | 0.33 | 4.7 |
| Example 4 | 344 | 1.02 | 0.64 | 255.3 | 349 | 0.32 | 1.11 | 441.6 | 1.75 | 2.72 | 0.2 | 4.7 |
| Comparative Example 1 | 342 | 0.49 | 0.6 | 323.4 | 343 | 0.46 | 0.6 | 388.4 | 1.20 | 0.94 | 15.97 | 1.8 |
| Comparative Example 2 | 344 | 1.02 | 0.64 | 255.3 | 342 | 0.35 | 1.31 | 499.7 | 1.95 | 1.40 | 1.19 | 3.4 |
| Comparative Example 3 | 344 | 1.02 | 0.64 | 255.3 | 349 | 0.32 | 1.53 | 441.6 | 2.17 | 3.75 | 0.06 | 8.4 |

TABLE 2

| Wavelength (nm) | Transmittance rate (%) | | | | | | |
|---|---|---|---|---|---|---|---|
| | Example 1 | Example 2 | Example 3 | Example 4 | Comparative Example 1 | Comparative Example 2 | Comparative Example 3 |
| 400 | 0.36 | 0.56 | 0.33 | 0.2 | 15.97 | 1.19 | 0.06 |
| 399 | 0.18 | 0.3 | 0.16 | 0.09 | 12.21 | 0.63 | 0.03 |
| 398 | 0.07 | 0.12 | 0.07 | 0.04 | 8.45 | 0.28 | 0.01 |
| 397 | 0.03 | 0.06 | 0.03 | 0.02 | 5.99 | 0.13 | 0.01 |
| 396 | 0.01 | 0.02 | 0.01 | 0.01 | 3.61 | 0.05 | 0.01 |
| 280-395 | 0-0.03 | 0-0.03 | 0-0.03 | 0-0.03 | 0-2.2 | 0-0.03 | 0-0.03 |

In addition, clouding occurred in the eyeglass lens for evaluation in Comparative Example 3.

From the results shown in Table 1, it was found that the eyeglass lenses for evaluation in Examples 1-4 in which the M value was greater than 1.40 and less than 3.20 had excellent ultraviolet absorbency and low yellowness. However, the desired effect was not obtained in the eyeglass lenses for evaluation in Comparative Examples 1-3 in which the M value was not within the predetermined range.

The invention claimed is:

1. An eyeglass lens prepared using a resin composition containing m-xylylene diisocyanate, a polythiol compound, and an ultraviolet absorber, wherein the ultraviolet absorber contains at least a compound represented by formula (1) and a compound represented by formula (2) and the M value represented by formula (X) is greater than 1.40 but less than 3.20:

[Structure 1]

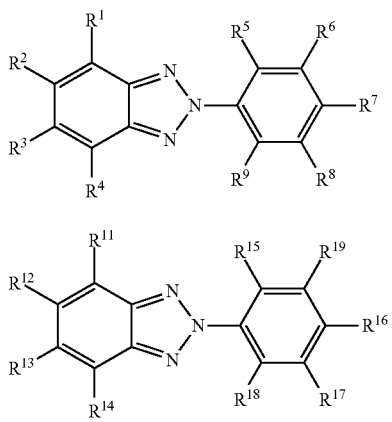

Formula (1)

Formula (2)

(wherein in formula (1), $R^1$-$R^9$ each independently represent a hydrogen atom, an alkyl group, an alkoxy group, or a hydroxyl group; in formula (2), $R^{11}$-$R^{18}$ each independently represent a hydrogen atom, an alkyl group, an alkoxy group, or a hydroxyl group or a halogen atom, $10^{19}$ represents a hydrogen atom, an alkyl group, an alkoxy group, or a phenylalkyl group or a group represented by the following formula (3); however, if $R^{19}$ is a hydrogen atom, an alkyl group, or an alkoxy group, at least one of $R^{11}$-$R^{14}$ is a halogen atom;

*-L-$R^{20}$  Formula (3)

wherein in formula (3), L represents an alkylene group; $R^{20}$ represents an optionally substituted aromatic hydrocarbon group or heterocyclic ring group; and M value=$[\lambda_2-\lambda_1] \times (A_2/A_1) \times (W_2/W_1)$  Formula (X)

wherein in formula (X), $\lambda_1$ represents the maximum absorption wavelength of a compound represented by formula (1) in the ultraviolet-visible absorption spectrum of a chloroform solution in which the concentration of a compound represented by formula (1) is 10 weight ppm; $\lambda_1$ represents the maximum absorption wavelength of a compound represented by formula (2) in the ultraviolet-visible absorption spectrum of a chloroform solution in which the concentration of a compound represented by formula (2) is 10 weight ppm;

$A_1$ represents the absorbance at the maximum absorption wavelength of a compound represented by formula (1) in the ultraviolet-visible absorption spectrum of a chloroform solution in which the concentration of a compound represented by formula (1) is 10 weight ppm;

$A_2$ represents the absorbance at the maximum absorption wavelength of a compound represented by formula (2) in the ultraviolet-visible absorption spectrum of a chloroform solution in which the concentration of a compound represented by formula (2) is 10 weight ppm;

$W_1$ represents the amount (in parts by weight) of a compound represented by formula (1) when the total of the m-xylylene diisocyanate and the polythiol compound is 100 parts by weight; and $W_2$ represents the amount (in parts by weight) of a compound represented by formula (1) when the total of the m-xylylene diisocyanate and the polythiol compound is 100 parts by weight.

2. The eyeglass lens as claimed in claim 1, wherein the amount of ultraviolet absorber having a molecular weight of 360 or less is less than 0.7 parts by weight when the total of the m-xylylene diisocyanate and the polythiol compound is 100 parts by weight.

3. The eyeglass lens as claimed in claim 1, wherein the sum of $W_1$ and $W_2$ is 0.1 parts by weight or more.

4. The eyeglass lens as claimed in claim 1, wherein the molecular weight of a compound represented by formula (1) is 360 or less.

5. The eyeglass lens as claimed in claim 1, wherein the molecular weight of a compound represented by formula (2) is greater than 360.

6. The eyeglass lens as claimed in claim 1, wherein a compound represented by formula (2) is represented by the following formula (4):

[Structure 2]
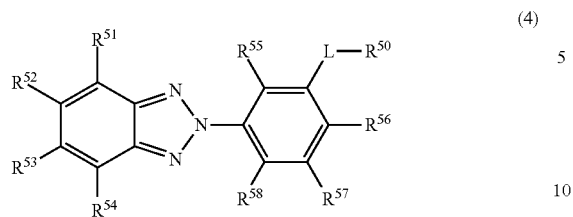
(4)
(wherein in formula (4), $R^{51}$—$R^{58}$ each independently represent a hydrogen atom, an alkyl group, alkoxy group or a hydroxyl group, L represents an alkylene group, $R^{50}$ represents an optionally substituted aromatic hydrocarbon group or a heterocyclic ring group.
\* \* \* \* \*

UNITED STATES PATENT AND TRADEMARK OFFICE
CERTIFICATE OF CORRECTION

PATENT NO. : 10,852,454 B2
APPLICATION NO. : 16/306854
DATED : December 1, 2020
INVENTOR(S) : Hideyuki Wakiyasu Page 1 of 1

It is certified that error appears in the above-identified patent and that said Letters Patent is hereby corrected as shown below:

In the Claims

Claim 1, Column 18, Line 25:
Delete "$\lambda_1$ represents" and replace with -- $\lambda_2$ represents --.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*